United States Patent Office 2,836,687
Patented May 27, 1958

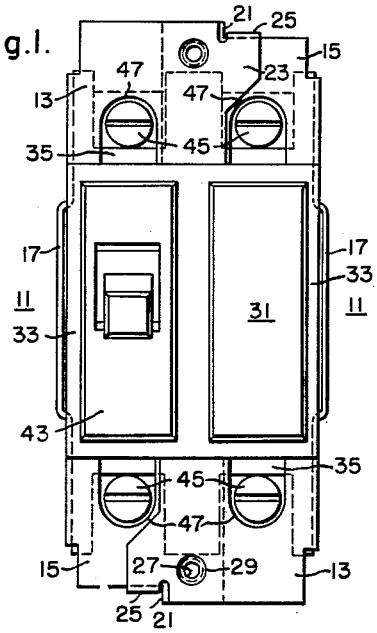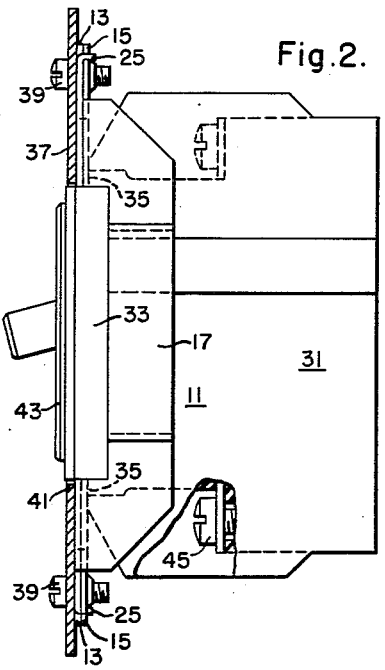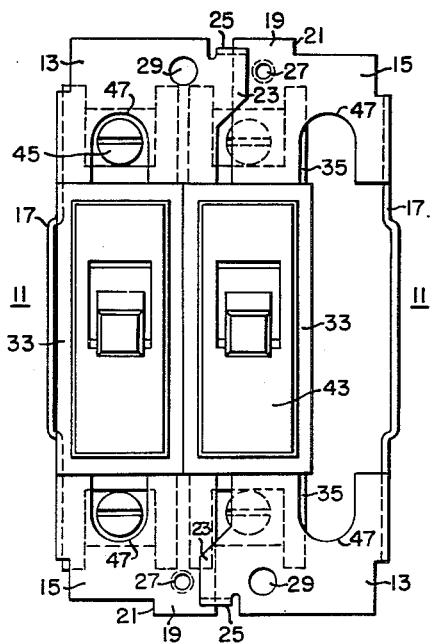

2,836,687

MOUNTING MEANS FOR CIRCUIT BREAKERS

Francis L. Gelzheiser, Brighton Township, Beaver County, and Hiller D. Dorfman, Beaver, Pa., assignors to Westinghouse Electric Corporation, East Pittsburgh, Pa., a corporation of Pennsylvania Application May 18, 1956, Serial No. 585,808

10 Claims. (Cl. 200—168)

This invention relates to circuit breakers and more particularly to mounting devices for removably supporting a circuit breaker on a panel.

An object of the invention is to provide a mounting device for removably supporting one or more circuit breakers on a panel.

Another object of the invention is to provide a mounting device for removably mounting a multipole circuit breaker on a panel without the circuit breaker being positively fastened to the mounting device.

Another object of the invention is to provide a mounting device for mounting a circuit breaker on a panel so that the breaker handle is accessible from the front of the panel.

Another object of the invention is to provide a mounting device for front mounting a multipole circuit breaker or two single pole circuit breakers on a panel so that the breaker handles are accessible from the front of the panel.

The invention, both as to structure and operation, together with additional objects and advantages thereof, will be best understood from the following detailed description thereof when read in conjunction with the accompanying drawing.

In said drawing:

Figure 1 is a front elevational view showing the mounting device applied to a circuit breaker.

Fig. 2 is a side elevational view showing a circuit breaker supported in the mounting device which is attached to a panel.

Fig. 3 is a front elevational view showing the mounting device being placed in position on two single pole circuit breakers.

Referring to Fig. 3 of the drawing, the mounting device comprises a pair of identical brackets indicated generally at 11. Each of the brackets 11 comprises end portions 13 and 15 joined by a side member 17 formed at right angles to the end portions 13 and 15. Each of the brackets 11 is provided at one end with an extension 19 forming a shoulder 21 and the other end has an off-set portion 23 from which an ear 25 is bent downwardly at right angles thereto.

The end portions 15 of the brackets 11 are provided with tapped holes 27 and the end portions 13 are provided with slightly larger holes 29 which, when the brackets are brought into their final positions are adapted to be in alignment with the holes 27.

A circuit breaker of the type adapted to be supported in the mounting device 11 is indicated generally at 31 (Figs. 1 and 2). The housing of the circuit breaker 31 is provided with laterally extending projections 33 disposed on opposite sides of the breaker adjacent the front or handle portion of the housing. Adjacent the ends of the projections 33 the breaker housing is provided with flat surfaces indicated at 35.

The mounting device is easily and readily assembled on the circuit breaker by first placing one of the brackets 11 laterally in position against the side of the breaker 31 with the end portions 13 and 15 on the flat surfaces 35 and the side member 17 under the projection 33 on the side of the breaker housing. As shown in Fig. 3, the left-hand bracket has been placed in this position. The other, or right-hand bracket 11, with the ends reversed as shown in Fig. 3, is then placed in position by flexing the end portions so that the ears 25 slide over the extensions 19. The brackets 11 are then pressed toward each other until the ears 25 snap into position behind the shoulders 21. In this position of the parts the brackets 11 are locked together and the mounting device is rigidly locked to the circuit breaker between the flat surfaces 35 and the projections 33 with the openings 27 and 29 in register.

The circuit breaker and the mounting device are not otherwise fastened together and may be easily dismantled by flexing the end portions 13 and 15 so that the ears 25 clear the extensions 19. The brackets 11 may then be simply pulled apart so that the circuit breaker may be inspected or replaced.

As shown in Fig. 2, after the mounting device is assembled on the circuit breaker, it is readily mounted on a panel 37 by means of screws 39 which pass through openings in the panel and are screwed into the tapped holes 27, the panel 37 being provided with an opening 41 through which the front or handle portion 43 of the breaker extends.

The circuit breaker 31 is provided with terminals 45 (Fig. 1) at each end, there being a terminal 45 at each end for each pole of the breaker, and openings 47 are provided in the end portions 13 and 15 so that the terminals 45 are accessible to a screw driver placed through the holes, without removing the mounting device from the breaker.

While the mounting device has been illustrated as applied to a two-pole breaker and to two single-pole breakers, it will be obvious that it can readily be used on one or three pole breakers by making the parts of the proper dimensions.

The mounting device may easily be installed in the field and the breaker mounted therein may be easily removed and a breaker of different rating mounted therein. The quick and easy removability of the breaker from the mounting device makes access to the terminals of the breaker and the connecting wires much easier. The mounting device is also adapted for the front mounting of a circuit breaker such as in wall boxes or panels that are closed at the rear or which have no rear mounting surface.

While the invention has been disclosed in accordance with the provisions of the patent statutes, it is to be understood that various changes in the structural details thereof may be made without departing from the spirit of the invention.

We claim as our invention:

1. A circuit breaker mounting device comprising a pair of separate rigid members positioned on opposite sides of said circuit breaker, end portions on each of said members, a rigid side portion on each of said separate members joining said end portions, said side portions, when said rigid members are in position, engaging behind lateral projections on opposite sides of said circuit breaker to hold said breaker in place, and locking means on each of said end portions interlocking to hold said separate members together when said members are placed in position on said circuit breaker.

2. A circuit breaker mounting device comprising a pair of separate rigid members positioned on opposite sides of said circuit breaker, end portions at opposite ends of each of said separate members, a rigid side portion on each of said members, said end portions and said side portions having surfaces thereon engaging surfaces on said circuit breaker to firmly and positively hold said breaker, and interlocking means on each of said end portions of said separate members coacting to hold said members together.

3. A circuit breaker mounting device comprising separate rigid members positioned one on each side of said circuit breaker, flat end portions on each of said separate members, a rigid side portion on each of said separate members connecting said flat end portions and extending along opposite sides of said circuit breaker when said members are in position, said separate members when in position forming between them an opening smaller than said circuit breaker through which opening a portion of said circuit breaker extends, said side portions when said members are in position engaging behind lateral projections on opposite sides of said circuit breaker to hold said breaker in said mounting device, and locking means on each end portion of each of said members interlocking said separate members together when said members are placed in position.

4. A circuit breaker mounting device comprising a pair of rigid members positioned on opposite sides of said circuit breaker and having flat end portions, a side portion on each of said members formed at right angles to said flat end portions, said rigid members having surfaces thereon engaging surfaces on said circuit breaker when said members are in position to firmly hold said circuit breaker, each of said members having a shoulder formed on one of its end portions and an ear on the other of its end portions formed at right angles thereto, said ears when said members are placed in position engaging said shoulders to hold said members together.

5. In combination, a circuit breaker having a housing, terminals on said housing for connecting said circuit breaker in an electric circuit, separate rigid members positioned on opposite sides of said housing and together forming an opening through which a portion of said housing extends, said rigid members having surfaces engaging surfaces on said housing to hold the circuit breaker in position, locking means on said separate rigid members interlocking said members together in position, and said rigid members having openings therein providing access to said terminals.

6. A circuit breaker mounting device comprising a pair of members positioned on opposite sides of said circuit breaker, each of said members having a flat portion at each end thereof, a side portion on each of said members formed at right angles to said flat end portions, said side portions when said members are in position engaging lateral projections on opposite sides of said circuit breaker to hold said breaker in place, an extension on the flat portion at one end of each of said members, an ear on the flat portion at the other end of each of said members, and said ears when said members are positioned on opposite sides of said circuit breaker engaging the adjacent extensions to lock the ends of said members together.

7. A circuit breaker mounting device comprising a pair of rigid members positioned on opposite sides of said circuit breaker and having flat end portions, a side portion on each of said members formed at right angles to said flat end portions, said rigid members having surfaces thereon engaging surfaces on said circuit breaker when said members are in position to firmly hold said circuit breaker, each of said members having a shoulder formed on one of its end portions and an ear on the other of its end portions formed at right angles thereto, said ears when said members are placed in position engaging said shoulders to hold said members together, and said ears being disengageable from said shoulders to permit removal of said circuit breaker from said mounting device.

8. A circuit breaker mounting device comprising a pair of separate rigid members positioned on opposite sides of said circuit breaker and electrically insulated from said circuit, end portions on each of said separate members, a rigid side portion on each of said separate members joining said end portions, said side portions extending substantially the length of said circuit breaker and when said members are in positions engaging behind lateral projections on opposite sides of said circuit breaker to hold said breaker in place, and locking means on each of said end portions interlocking said separate members together on said circuit breaker.

9. A circuit breaker mounting device for front mounting a plurality of circuit breakers comprising a pair of separate rigid members at the outer sides of said circuit breakers, end portions on each of said members, a rigid side portion on each of said separate members joining said end portions, said side portions when said separate members are in position engaging behind lateral projections on the outer sides of said circuit breakers to hold said circuit breakers in place, and locking means on each of said end portions interlocking when said separate members are placed in position to hold said members together to firmly support said plurality of circuit breakers.

10. A circuit breaker mounting device for mounting a plurality of circuit breakers comprising a pair of separate rigid members adapted to be positioned on the outer sides of said circuit breakers, end portions at opposite ends of said separate members, a rigid side portion on each of said separate members, said end portions and said side portions of said separate members having surfaces thereon engaging surfaces on said circuit breakers to firmly and positively hold said circuit breakers, and separate locking means on each of said separate members interlocking when said members are in position to hold said members together.

References Cited in the file of this patent

UNITED STATES PATENTS 2,733,321  Dorfman et al. _____ Jan. 31, 1956